March 30, 1926.
F. H. OWENS
STEREOSCOPIC APPARATUS
Filed May 7, 1924
1,579,025
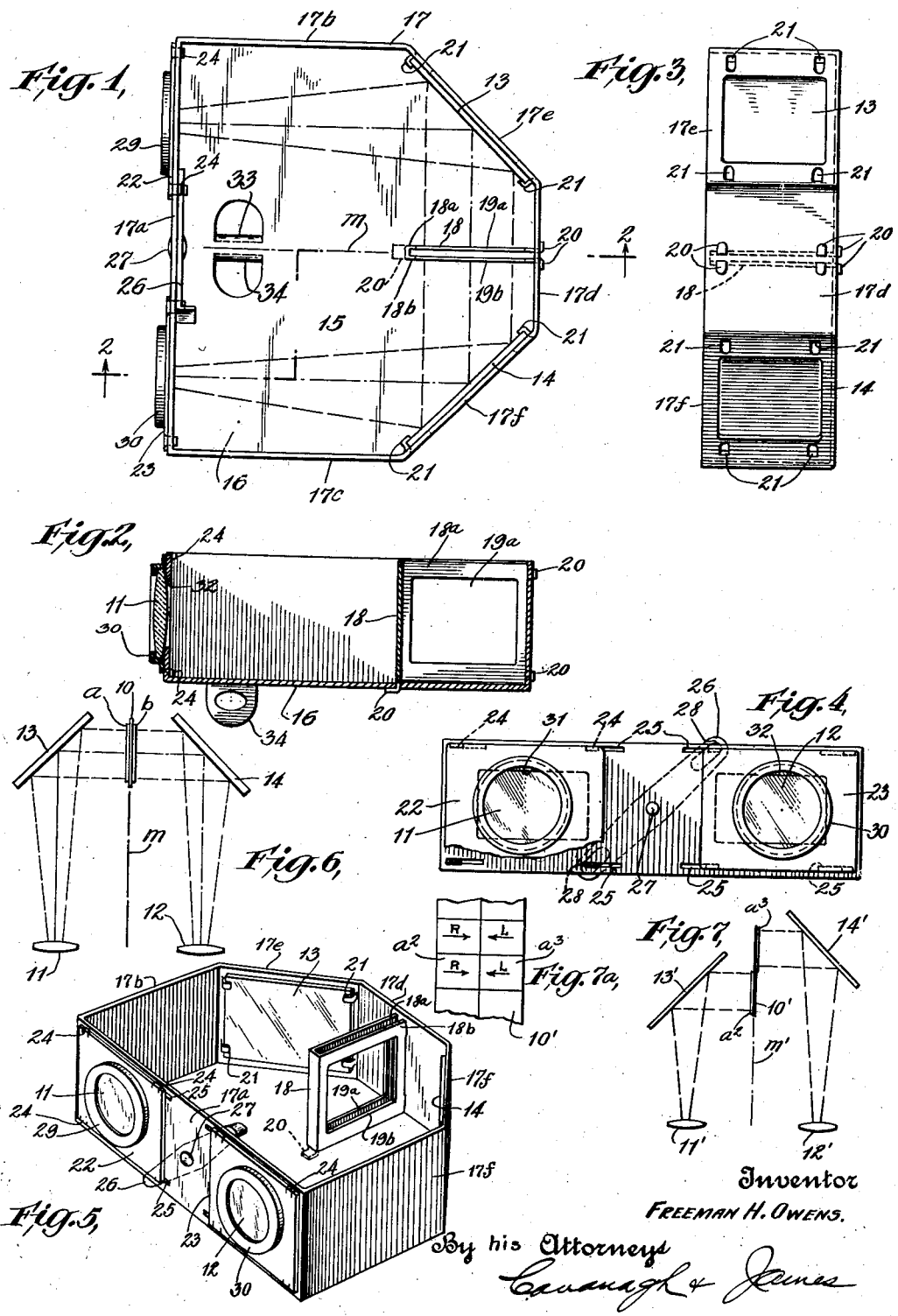
Inventor
FREEMAN H. OWENS.
By his Attorneys
Cavanagh & James Patented Mar. 30, 1926.

1,579,025

UNITED STATES PATENT OFFICE.

FREEMAN H. OWENS, OF NEW YORK, N. Y.

STEREOSCOPIC APPARATUS.

Application filed May 7, 1924. Serial No. 711,574.

*To all whom it may concern:*

Be it known that I, FREEMAN H. OWENS, a citizen of the United States, residing at New York city, in the county and State of New York, have invented certain new and useful Improvements in Stereoscopic Apparatus, of which the following is a specification.

This invention relates to a stereoscopic apparatus, and has special reference to the provision of an optical apparatus for exhibiting stereoscopic pictures.

Stereoscopic devices for selectively exhibiting a pair of "right-eye" and "left-eye" pictures so that the same may be selectively viewed by the right and left eyes of the observer are well known; and a common method of stereoscopically exhibiting such pictures consists in arranging the pictures of a pair in laterally spaced relation so that the same may be selectively presented for exhibiting purposes.

When the stereoscopic apparatus comprises a camera or viewing device, the distance between the taking or viewing lenses, corresponding to the distance betweeen the eyes of the observer, is about 2½ inches, so that the distance between the centers of the images taken or viewed is generally of the same order of magnitude, with the result that the common form of stereoscope wherein the pictures are arranged in laterally separated relation is ill adapted for stereoscopic images of comparatively large or small dimensions. These stereoscopes, for example, are not well suited for motion picture film due to the relatively small dimensions of the latter, and where film of motion picture size is employed, either a plurality of laterally spaced single width films must be used, necessitating the utilization of duplicate and complex feeding mechanism, or a single image carrier or film of abnormal width must be employed, involving the usual difficulties incident to the feeding of such extra width film and entailing waste of material due to the need for the excess width of film employed. A prime object of the present invention relates to the provision of a steroscopic apparatus in which these disadvantages are obviated and in which stereoscopic images of relatively small or relatively large size may be employed with equal facility and advantage.

Further objects of the invention may be said to include the provision of a stereoscopic apparatus in which the images of a stereoscopic pair are arranged in a single plane without any lateral separation therebetween, the lateral separation being obtained optically; and the further provision of a stereoscope having the parts relatively coordinated to produce a compact organization which may be manufactured at exceedingly low cost either as a "still" or motion picture device.

To the accomplishment of the foregoing and such other objects as will hereinafter appear, my invention consists in the elements and their relation one to the other, as hereinafter more particularly described and sought to be defined in the claims; reference being had to the accompanying drawings which show preferred embodiments of my invention, and in which:

Fig. 1 is a plan view of a preferred embodiment of the invention,

Fig. 2 is an elevational view taken in cross-section on the line 2—2, Fig. 1,

Fig. 3 is a rear elevational view of the same,

Fig. 4 is a front view of the same with parts broken away,

Fig. 5 is a perspective view of the same,

Fig. 6 is an optical explanatory diagrammatic view showing the principles of the invention, Fig. 7 is an optical diagrammatic view of a modification, and Fig. 7ᵃ is a view of film which is employed with the form of the invention shown in Fig. 7.

Before describing in detail the constructional features of the invention, I will briefly premise that in the stereoscopic apparatus employing the principles of my invention, the images of the stereoscopic pair are arranged in substantially a single plane without any lateral separation therebetween, both of the images being reflected for exhibiting purposes to the laterally separated positions. These principles are optically depicted in Fig. 6 of the drawings, wherein an image carrying element 10 is arranged in a median plane $m$ and intermediate a pair of optical devices 11 and 12 which preferably comprises a pair of lenses, the image carrying element lying in a plane which is substantially parallel to the axes of the optical devices 11 and 12. The element 10 may be either a "still" or motion picture film of the opaque type having in one form of my invention a pair or a plurality of pairs of stereoscopic images $a$ and $a'$ on opposite sides thereof. For producing the desired lateral separation of the images, there is provided the reflecting elements 13 and 14 arranged on opposite sides of the picture carrying element 10 and behind the lenses 11 and 12, each of the reflecting elements being located at an angle of 45° to said median plane $m$. With this construction, it will be seen that the images $a$ and $a'$ irrespective of their dimensions may be given the desired lateral separation for stereoscopically exhibiting the same, the arrangement permitting of a compact organization and of a facility in locating and feeding the image carrying element not possessed by known forms of stereoscopic exhibiting devices.

Referring now to Figs. 1 to 5 of the drawings, I show the principles of my invention embodied in a stereoscopic viewing apparatus. This apparatus preferably comprises a frame generally designated as 15 (see Fig. 1) which desirably is made of sheet material, as for example sheet metal, stamped to produce a bottom wall 16 and a side wall 17 contoured to present a front wall portion $17^a$, two side wall portions $17^b$ and $17^c$, a rear wall portion $17^d$, and two angularly related connecting wall portions $17^e$ and $17^f$ both arranged at angles of 45° to a median plane $m$ of the frame.

For locating an image carrying element of either the "still" or motion picture type in the median plane $m$ of the frame, there is provided an image holder 18 also preferably made of sheet material bent to provide the opposite walls $18^a$ and $18^b$ having the openings $19^a$ and $19^b$ respectively for exposing opposite sides of an image carrier or film which is received between the walls of the holder, the said holder being fixed to the frame 15 preferably by securing the same to the bottom wall 16 and the rear wall $17^d$ of the frame, desirably by means of the lips 20, 20 formed integrally in the holder and received in suitable slots or apertures in the walls of the frame 15.

The connecting wall portions $17^e$ and $17^f$ are provided for holding the reflecting elements 13 and 14 and for inexpensiveness of construction the connecting walls $17^e$ and $17^f$ are provided with struck-out lip elements 21, 21 which are turned down into engagement with the reflectors 13 and 14 to hold the same in secured position.

The optical devices for viewing the stereoscopic images are in the preferred construction made adjustable to vary the lateral separation or the distance between the lenses, and in the preferred embodiment these optical devices consist of a plurality of lens carrying elements 22 and 23 also desirably made of sheet material, each of which is movably mounted on the front wall $17^a$ of the frame 15 so that the distance between the centers of the lenses may be varied at will. A preferred mode of mounting and moving the lens carrying elements on the frame for inexpensiveness of construction and assembly comprises the provision of a plurality of integral lips 24, 24 in each of the plate-shaped lens carrying elements which are received by elongated slots 25, 25 provided in the front wall $17^a$ of the frame 15, as clearly depicted in Figs. 4 and 5 of the drawings; a lateral adjustment of the lenses being obtained by means of a lever 26 which is fulcrumed as at 27 on the front wall frame $17^a$, the said lever being provided at its opposite ends with the slots 28, 28 which receive diagonally positioned lips in the plates 22 and 23 so that when the ends of the lever 26 are engaged by the fingers and moved about the fulcrum, the lens carrying devices will be simultaneously moved in opposite directions to adjust the same to the eyes of the observer.

For holding the lenses 11 and 12, the lens carrying elements 22 and 23 are suitably contoured to provide the annular seats 29 and 30, the lenses being held in position between these seats and the frame wall $17^a$ in registration with the openings 31 and 32 provided in the frame wall $17^a$, all as will be clear from a consideration of Figs. 2 to 4 of the drawings.

For providing a convenient hand hold, the bottom wall 16 of the frame may be provided with the struck-out portions 33 and 34 presenting parallelly arranged lips or fingers adapted to be grasped by the fingers of the user, as will be clear from a consideration of Figs. 1 and 2 of the drawings.

Referring now to Figs. 7 and $7^a$ of the drawings, I show a modification of my invention in which transparent instead of opaque film is employed. In this embodiment of the invention the steroscopic pictures $a^2$ and $a^3$ are arranged either on the same or on opposite sides of the transparent film 10' and spaced laterally on said film, as clearly shown in Figs. 7 and $7^a$ of the drawings, so that when the film is arranged in the median plane $m'$ the images will be spaced longitudinally in said plane; and the lateral separation of these images is effected by means of the reflectors 13' and 14' which are suitably spaced so that the reflector 13' is related to or associated with the image $a^2$ and the lens 11', and the reflector 14' is related to or associated with the image $a^3$ and the lens 12'.

The manner of making and using the steroscopic apparatus of my invention will in the main be fully apparent from the above detailed description thereof. It will be further apparent that while I have disclosed the preferred embodiment of the invention in the form of the stereoscopic viewing apparatus, the same may be employed as a taking apparatus or camera or as a projecting apparatus. It will be further apparent that when the same is employed for exhibiting motion pictures, a single width film may be utilized with a single feeding device, or a multiple width film may be employed with the images separated on the film to effect the greatest economy of film and without regard to the needful separation of the images for viewing purposes, these being important advantages of the present invention. It will further be apparent where transparent film is employed that the images thereon may be separated longitudinally of the film as well as laterally of the film, with the reflectors appropriately spaced or inclined to effect the desired inter-relation between the opposite sides of the image holder and the viewing lenses.

While I have shown the preferred form of my invention, it will be obvious that many other changes and modifications may be made in the structure disclosed without departing from the spirit of the invention defined in the following claims.

I claim:

1. A stereoscopic viewing apparatus comprising a pair of optical viewing devices occupying right and left eye positions, means for locating an image carrying element in a median plane intermediate the optical viewing devices and in a region substantially midway between the axes of the optical devices, said element being provided with images viewable from opposite sides of the same, and reflecting means arranged behind the optical devices and on opposite sides of said image locating means for relating each of the optical devices with an image on said image carrying element.

2. A stereoscopic apparatus having a pair of optical devices occupying right and left eye positions, means for locating an image bearing element intermediate the optical devices and substantially midway between and parallel to the axes of the optical devices, the said element lying in a single plane and being provided with images viewable from opposite sides of the same, and reflecting means arranged behind the optical devices and on opposite sides of said image bearing element for relating each of the optical devices with an image on said image bearing element.

3. A stereoscopic viewing apparatus comprising a pair of movable optical viewing devices occupying right and left eye positions, means for locating an image carrying element in a median plane intermediate the optical viewing devices and in a region substantially midway between the axes of the optical devices, said element being provided with images viewable from opposite sides of the same, means for moving the optical devices to vary the distance between their centers, and reflecting means arranged behind the optical devices and on opposite sides of said image plane for relating each of the optical devices with an image on said image carrying element.

4. A steroscopic viewing apparatus having a pair of optical viewing devices occupying right and left eye positions, means for locating an image bearing element intermediate the optical viewing devices and substantially midway between and parallel to the axes of the optical viewing devices, the said element lying in a single plane and being provided with images viewable from opposite sides of the same, and reflecting means arranged behind the optical viewing devices and on opposite sides of said image bearing element for relating each of the optical devices with an image on said image bearing element.

5. A stereoscopic viewing apparatus comprising a frame, a holder for an image bearing element arranged in a median plane of said frame and constructed to expose images on said element from opposite sides of the holder, said element being provided with images viewable from opposite sides of the same, reflectors carried by said frame on opposite sides of said holder, and optical viewing devices occupying right and left-eye positions and carried by said frame on opposite sides of said median plane and arranged anterior to said reflectors.

6. A stereoscopic apparatus comprising a frame made of sheet material, a holder for an image bearing element attached to said frame and arranged in a median plane of said frame and constructed to expose images on said element from opposite sides of the holder, a pair of reflectors carried by said frame and arranged on opposite sides of said holder, each reflector being located at an angle of 45° to said median plane, a pair of movable lens carrying devices occupying right and left-eye positions and carried by said frame on opposite sides of said median plane and arranged anterior to said reflectors, and means for simultaneously moving said lens carrying devices to vary the distance between their centers.

7. A stereoscopic viewing apparatus comprising a frame made of sheet material, a holder for an image bearing element attached to said frame and arranged in a median plane of said frame and constructed to expose images on said element from opposite sides of the holder, a pair of reflectors carried by said frame and arranged on opposite sides of said holder, each reflector being located at an angle of 45° to said median plane, a pair of movable viewing lens carrying devices occupying right and left-eye positions and carried by said frame on opposite sides of said median plane and arranged anterior to said reflectors, and means for simultaneously moving said lens carrying devices to vary the distance between their centers, the said means comprising a lever oscillatably carried by the frame and connected to the said lens carrying devices.

8. A stereoscopic viewing apparatus comprising a frame made of sheet material and including a bottom wall and a side wall, an image holder also made of sheet material and attached to the bottom and side wall of said frame and arranged in a median plane thereof, a pair of reflectors carried by the side wall of the frame and arranged on opposite sides of said holder, and a pair of viewing lens carrying devices movably carried on the front of said side wall, a lens carrying device being associated with a reflector and with one side of said holder.

In testimony whereof, I have signed my name to this specification this 30th day of April, 1924.

FREEMAN H. OWENS.